Nov. 26, 1963 P. RAIBOURN ETAL 3,112,421

DISPLAY SCREEN GRID STRUCTURE FOR COLOR TELEVISION TUBES

Filed Aug. 12, 1960 8 Sheets-Sheet 1

*INVENTORS.*
Paul Raibourn
Harry Gewertz

BY William V. Pearce

ATTORNEY.

Nov. 26, 1963 P. RAIBOURN ETAL 3,112,421

DISPLAY SCREEN GRID STRUCTURE FOR COLOR TELEVISION TUBES

Filed Aug. 12, 1960 8 Sheets-Sheet 2

*INVENTORS.*
Paul Raibourn
Harry Gewertz

*BY* William T. Pease

*ATTORNEY.*

INVENTORS.
Paul Raibourn
Harry Gewertz
BY William V. Pease
ATTORNEY.

DISPLAY SCREEN GRID STRUCTURE FOR COLOR TELEVISION TUBES

INVENTORS.
Paul Raibourn
Harry Gewertz
BY William V. Pease
ATTORNEY.

Nov. 26, 1963 P. RAIBOURN ETAL 3,112,421

DISPLAY SCREEN GRID STRUCTURE FOR COLOR TELEVISION TUBES

Filed Aug. 12, 1960 8 Sheets-Sheet 5

*INVENTORS.*
Paul Raibourn
Harry Gewertz

*BY* William V. Pearce

ATTORNEY.

DISPLAY SCREEN GRID STRUCTURE FOR COLOR TELEVISION TUBES

Filed Aug. 12, 1960 8 Sheets-Sheet 6

INVENTORS.
Paul Raibourn
Harry Gewertz
BY William V. Pesce
ATTORNEY.

INVENTORS.
Paul Raibourn
Harry Gewertz
BY
William V. Pesce
ATTORNEY.

Nov. 26, 1963 P. RAIBOURN ETAL 3,112,421

DISPLAY SCREEN GRID STRUCTURE FOR COLOR TELEVISION TUBES

Filed Aug. 12, 1960 8 Sheets-Sheet 8

INVENTORS.
Paul Raibourn
Harry Gewertz
BY William V. Pesce
ATTORNEY.

3,112,421

DISPLAY SCREEN GRID STRUCTURE FOR COLOR TELEVISION TUBES

Paul Raibourn, Southport City, Conn., and Harry Gewertz, Sea Cliff, N.Y., assignors to Paramount Pictures Corporation, New York, N.Y., a corporation of New York Filed Aug. 12, 1960, Ser. No. 49,331
12 Claims. (Cl. 313—78)

This invention relates to display tubes for reproducing television images in color and particularly to tubes utilizing an electron grid structure utilizing the post-deflection-focusing principle wherein the electron beam, after being deflected to scan the target area and the screen on which the picture is displayed is converged or refocused to a cross-sectional area of diminished size, so that it impacts a phosphor which is emissive of a single primary of component colors on the screen. In general the screen comprises a multiplicity of cells disposed in a repeating pattern thereon, each cell including a number of different phosphors each emissive of a single one of the component colors employed and the dimension of each cell being of the order of magnitude of a single elemental area or picture point of the image to be reproduced.

Two general methods are employed for selecting the particular phosphor upon which the converging beam falls; in accordance with one of these methods the angle of incidence of the beam at the focusing structure determines the location of the focal point, three electron guns, at slightly different positions originating the beam which fall on the different phosphors. The second method of color control comprises deflecting the beam slightly as it passes through the focusing structure to cause it to impact the phosphor desired.

Whichever method of color control is used the focusing is effected by a multiplicity of electron lenses, each one corresponding to an individual color cell with the aperture of each lens being approximately equal in dimension to the color cell to which it corresponds. In a preferred form of tube, in connection with which the present invention will particularly be described, the color cells are formed of strips of each of the phosphors used, the dimension of the cell transverse to the strips being of approximately the dimension of one picture point and the strips of individual phosphors occupying sub-areas of less than picture element width within the group forming the cell. In the other dimension the strips extend completely across the screen. Each of the electron lenses used with this type of screen is the analogue of a cylindrical lens, the aperture of each lens being the interspace between an adjacent pair of elongated linear conductors (which may be either wires or tapes) which extend, substantially parallel to the strips forming the color cell, in the form of a grid covering the entire area of the display screen as viewed from the source of the electron beam or beams. Where microdeflection at the lens structure is used to select the color displayed, the linear conductors defining the apertures of the electron lenses are divided into two interleaved and mutually insulated sets; a potential difference applied between the two sets will then deflect the electrons passing through the aperture to one side or the other, and in the absence of any potential difference somewhere mid-way between a pair of the conductors.

In order to establish the electron lenses, at least one additional electron-permeable electrode is necessary. In one form of lens, which has numerous practical advantages, this last-mentioned electrode comprises a conducting film or layer, overlying the phosphors of the screen, which is operated at a potential strongly positive to the aperture forming electrode or "color-grid," the voltage between the color-grid and the film usually being from two and a half to three times that between the electron source and the color grid.

In spite of its simplicity this type of lens structure has several disadvantages. The focal lengths of the elemental electron lenses depend primarily on two factors; (*a*) the spacing between the color-grid and the conducting film on the display screen, and (*b*) the component, normal to the color grid and screen surfaces, of the relative velocities imported to the electrons of the scanning beam by the voltage drops between the electron emitting cathode tube and the grid $V_1$, and that between the grid and the film $V_2$. If the ratio between these velocities is $$\frac{V_2}{V_1}=\frac{\cos^2 X}{\cos^2 B}(1+2\cos B)$$

where X is the angle of deflection of the beam and B is the angle of the component of X normal to the grid conductors, the electron will be brought to a focus on the screen surface. Because of the scanning deflection, however, the angle of incidence of the beam is constantly changing, and, therefore, with the grid and the film at fixed potentials, the ratios and hence the focus vary over the screen surface. The same factors that affect focusing also affect the sensitivity of the beam to the microdeflection at the grid which controls the color, this microdeflection increasing with the scanning angle.

In the past to overcome these limitations a compromise focusing voltage was chosen with the result that the beam was somewhat underfocused at the center of the screen and overfocused at the edges. Also to maintain a constant deflection sensitivity, the screen was somewhat shaped to provide a continually shorter travel of the beam, as the angle of deflection increased, within the space between the color control grid and the conductive film. At best both of these remedies were make-shift affairs and did not solve the problem.

The color control grid utilized for controlling the microdeflection of the beam in the area between grid and screen is generally composed of a plurality of parallel spaced fine wires held under tensions by a rigid structural frame. To maintain a uniform electron-lense effect the wires had to be accurately spaced and properly tensioned to prevent sagging and mis-alignment. This of necessity meant that the grid structure had to be maintained in a vertical position along the minor axis, no other degree of freedom being allowed, although there was freedom of movement along the major axis. In other words, there could be no curvature of the grid along the minor axis whereas there could be some freedom of curvature along the major axis. Hence, the grid could only follow the curvature of the viewing panel or screen along the major axis but not along the minor axis. Therefore, it became necessary to fit the glass panel to the curvature of the grid, necessitating special molds and techniques for properly forming the glass panel, a costly and time consuming process. Further, because the wires of the grid had to be tensioned, they were subject to vibrations as a result of the cyclic variations of the color switching potentials applied thereto thereby necessitating the application of dampening rods interspaced at random intervals between the said wires. This was also a time consuming and costly process.

The broad purpose of the present invention is to provide a lens structure which will overcome these difficulties but still retain the advantages of post-deflection-acceleration, with the conservation of deflecting power which this entails, while maintaining screen brightness. Contributory to this broad purpose, among the objects of the invention are to provide a grid structure which will minimize the differences in sensitivity to focusing and deflection over the screen surface; to provide a grid structure which will readily and easily conform to the configuration of a screen or viewing panel in the color tube; to provide a grid structure disposed to be unresponsive to vibratory effects produced by cyclic variations in color switching potentials; to provide a method for making a grid structure which is economical, accurate, efficient and enhances the registry between the screen and the said grid; and to provide a grid structure which will retain its spacial configuration and be self supporting.

Other objects and advantages will become apparent from the detailed description of certain preferred embodiments which follow taken in conjunction with the accompanying drawings, wherein—

Figures 1, 2:
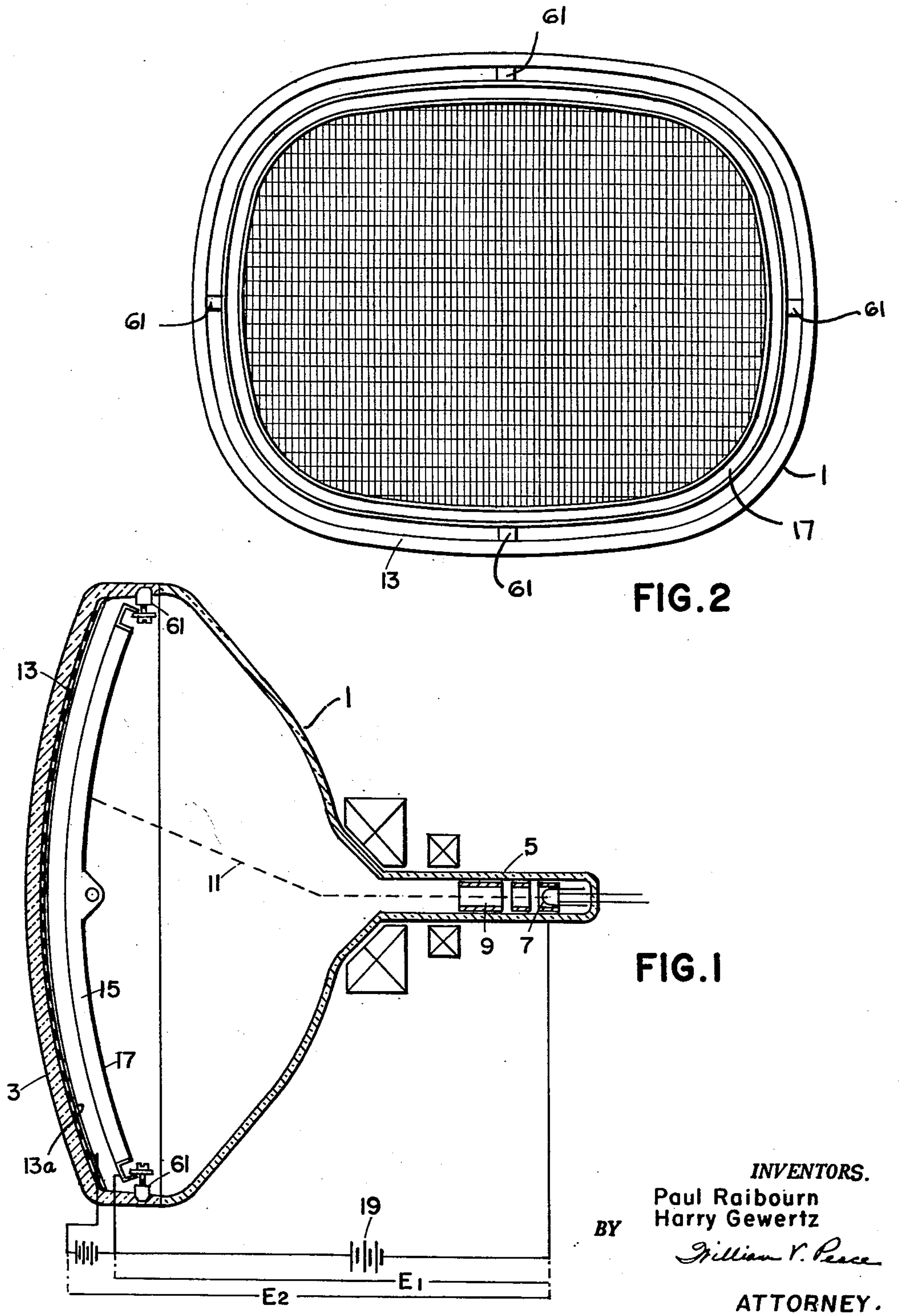
FIGS. 1 and 2 show a cathode-ray tube employing the post-deflection-focusing grid principle and the relative positioning of the grid with respect to the screen surface according to the invention.

Throughout the description herein wherever possible like or similar parts or portions will be designated by the same reference numerals. Now considering FIG. 1 which includes the tube itself, the drawing shows in diagram form the various elements of a tube of the general character herein described as constructed in accordance with past practice. The tube comprises the usual funnel shape envelope 1 of metal or glass having a transparent window 3 at its larger end, and a neck 5 at the opposite extremity. Within the neck of the tube is an electron gun, an important element whereof for the purpose of the present explanation are an electron emitting cathode 7 and a final anode 9 for developing an electron beam, illustrated by the dash line 11, which are scanned over the target area within the window 3 in the operation of the tube. Within the target area is positioned a target surface or display screen 13 which comprises the usual transparent base with its red, green, and blue striped phosphors and conductive coatings 13*a* as have already been described. Adjacent to the screen and in close proximity thereby there is a color grid structure for controlling the point of impingement of the electron beam upon the screen. Both the display screen 13 and the color grid 15 are maintained accurately in their proper relative positions by a supporting structure which is not shown but is usually supported from a conducting frame 17 which is sealed through the wall of the tube at the junction between the conical shell of the window 3. This supporting structure is omitted for clarity since various suitable arrangements have been described in the past and are now well-known. Through a suitable source or sources of potential symbolically illustrated by potential source 19 proper relative potentials are applied to various electrodes of the structure.

Figures 3, 6:
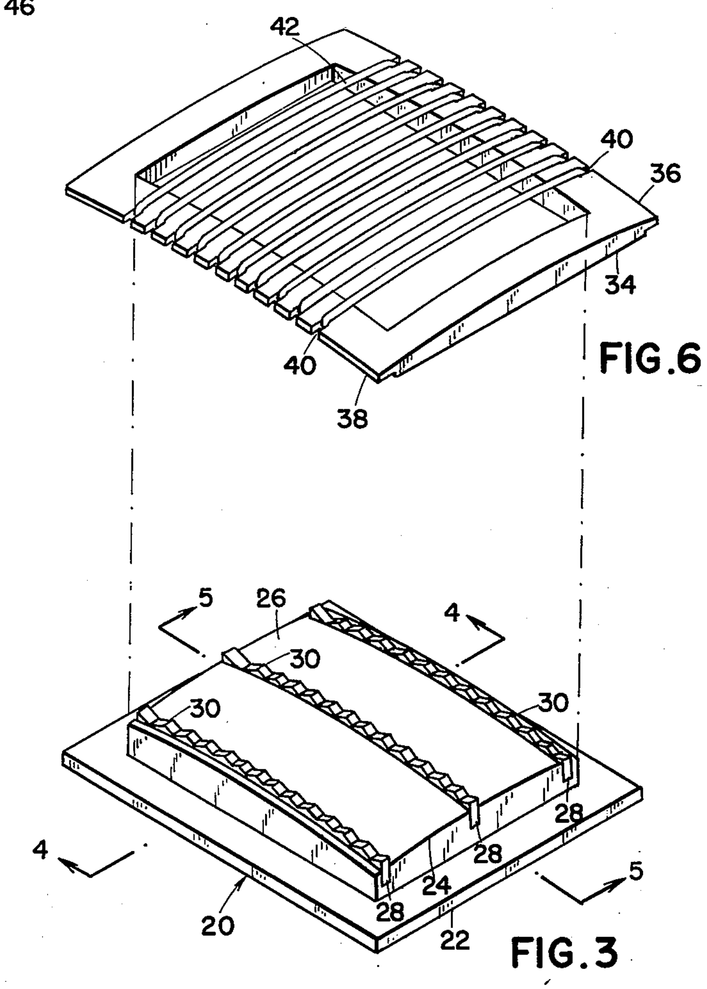
FIG. 3 shows in perspective the grid winding frame and the steel combs attached thereto upon which the grid wires are wound according to the invention.
FIG. 6 shows in perspective the grid wire overlay frame about which the grid wires are first wound in a continuous and snake-like fashion.
Figure 4:
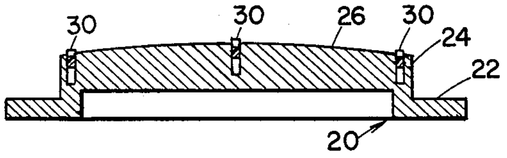
FIG. 4 shows a section of the grid winding frame of FIG. 3 through the section line 4—4 and transverse to the attached combs.
Figure 5:
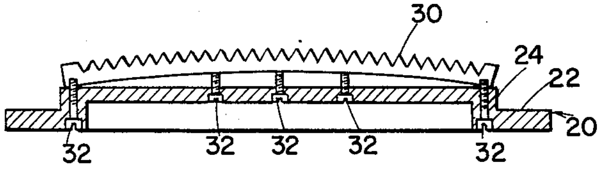
FIG. 5 shows a section of the grid winding frame of FIG. 3 through the section line 5—5 longitudinal to and through the attached combs.

The manner of making of forming the grid to conform to the particular type viewing panel or screen configuration, can be seen from a study of the FIGS. 3–16. In particular, there is shown in FIG. 3 a grid winding frame consisting of a base 22 and a body 24 having its surface 26 shaped to conform to the contour of the viewing panel or screen. It may be appreciated that this surface configuration can be cylindrical, spherical, or can even be of a compound nature where the surface radii on one side of the tube surface may be different along a pair of orthogonal axes. It is one of the advantages of the present invention that any surface configuration may be constructed and a grid structure made to conform to such configuration. A series of spaced parallel grooves 28 are carved out of the body 24 to each receive a comb or rack-like member 30. The rack member 30 as shown attached to the body in sectional FIGS. 4 and 5 are bar-like members having one of its longitudinal edges equivalent to the edge of a saw blade. The rack member has a degree of flexibility along its longitudinal dimension so that when inserted within the groove of the body it may be shaped to have its toothed edge conform to the curvature of the surface of the body and protruding slightly above the said surface. The rack member is clamped and attached to the body by adjusting screws 32, the screws being adjusted in such a manner as to make the rack member conform to the body surface. Although the drawings show only three rack members, additional members can be used depending on the size of the grid to be wound and the degree of curvature desired. The rack member itself can be of any strong and flexible material such as steel, aluminum, and even plastic as long as the said member conforms to the curvature of the surface of the body.

Figure 7:
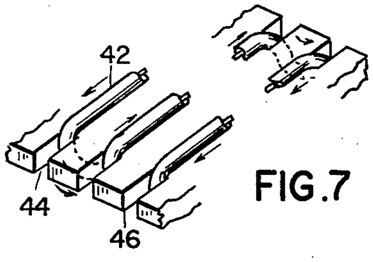
FIG. 7 shows in perspective a portion of the grid wire overlay frame and how the grid wires are wound to form a continuous winding.
Figure 8:
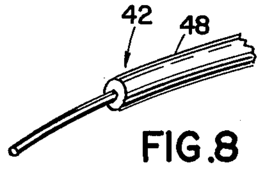
FIG. 8 shows in perspective a portion of the grid wire used for making the grid frame and covered with a coating of plastic or polyvinyl material.

In FIG. 6 there is shown an overlay frame 34 substantially rectangular in shape and having along a single pair of opposite edges 36 and 38 a series of notches or cutouts 40, the spacing or pitch between each of the respective notches being the pitch desired for the particular grid which is to be fabricated. The frame 34 is wound by any particular convenient means, and not shown, in a manner such that each strand of grid wire 42 first traverses the frame in a given direction and then is made to first go down into a single notch and then over and up into the next adjacent notch and finally out and across the frame again in the reverse direction to repeat the same sequence again until the frame is completely wound. FIG. 7 shows in more detail how the grid wire 42 first goes down into the notch 44 and over and up into the adjacent notch 46 and finally out and across to the opposite side of the frame. The grid wire itself can be of any fine gauge wire fairly strong and having ductile or malleable qualities. Such wire for example could be made out of aluminum, copper, gold, silver or the wire could be gold plated aluminum. Whichever wire is used, it is desirable that it have ductile qualities. It has been found through experiment that a highly ductile set of wires bent or formed into any given configuration will retain such configuration if they are made to retain their respective positions relative to each other. For example, if the grid wires are arranged in a parallel array, then they will retain the shape they have been bent to if they are prevented from moving transversely or sideways relative to their longitudinal directions. To this end, it has been found convenient to apply a wire 42, having an insulated coating 43 made of plastic or polyvinyl with a sufficiently low melting point so that when the particular plastic is subjected to the proper elevated temperature it will melt. This will be subsequently explained as the grid fabrication procedure is further detailed.

After the overlay frame 34 is completely wound with the appropriate grid wire as heretofore defined, the completed overlay frame is then placed in contact with the grid winding frame 20 in such a manner that each of the respective grid wires reposes and lays in a corresponding groove of the rack member so that the equally spaced parallel wires retain their same relative positions. It may be appreciated here that because of the malleable effects of the wires they will bend and form according to the shape of the surface of the grid winding frame body along the rack members. The overlay frame and grid winding frame are shown as a single complete unitary structure and held together by suitable clamps and bolts for the purpose, the grid wires being securely retained in each of the grooves of the rack members to assure correct contour conformity and spacial alignment.

It has been previously mentioned that if the spacial alignment of the wires could be accurately maintained, then the grid could be shaped or formed to have any desired contour or configuration, providing, however, the grid wires have a certain degree of ductileness. Hence by properly shaping or contouring the grid to properly match the viewing panel or screen it became unnnecessary to provide for any compensating effects in the beam deflection sensitivity as the beam approached the outer edges of the tube nor did it become necessary to effect any compensation for changes in spot size or focusing as a result of the change in deflection angle of the beam away from the center. Hence, to maintain proper alignment of the grid wires, it has been found useful to provide a series of glass rods or material of a similar nature and placing them in bonded contact with the grid wires and transversely thereto in such a manner that this spacial relation would always be maintained.

Figures 9, 10:
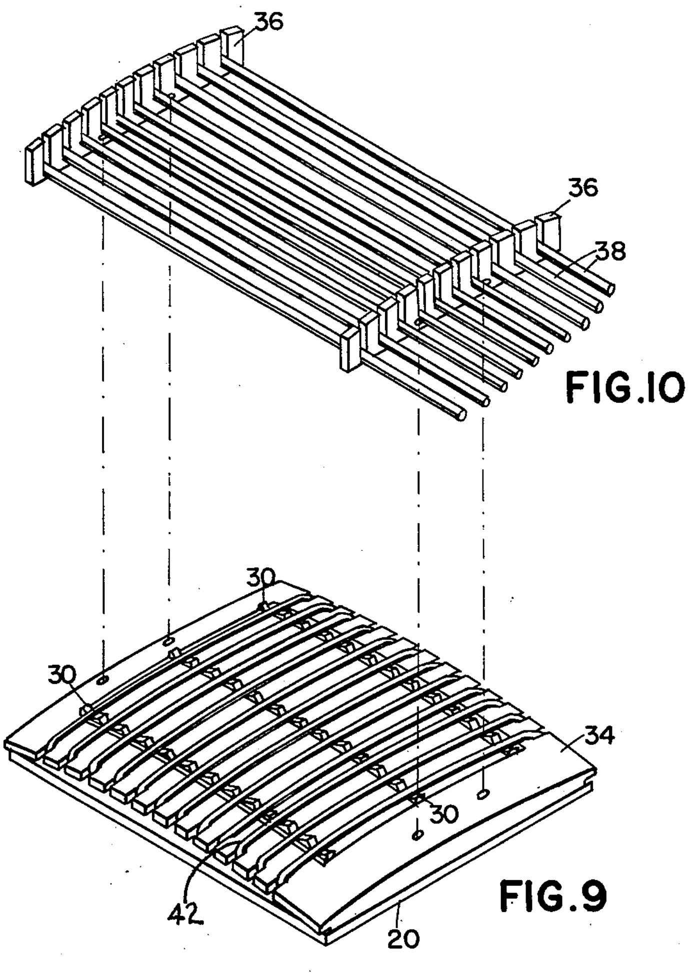
FIG. 9 shows in perspective an assembly of the grid winding frame and grid overlay frame comprising a unitary structure whereby the grid wires each are disposed to be completely embedded within each of the grooves in the respective combs attached to the winding frame.
FIG. 10 shows in perspective a transverse overlay frame having disposed thereon an array of parallel random-spaced heater wires transverse to the windings of the grid frame and each of the wires capable of having an electric heater current pass therethrough respectively.

FIGURE 9 shows the combined grid winding frame 20 and overlay frame 34 in position to receive a set of wire heaters so positioned with respect to the overlay frame that the said heater wires will be in direct contact with the grid wires. The purpose of the heater wires is to cause only the plastic of the grid wires in contact with the heater wires to substantially melt so that grooves are formed conforming to the curvature of the heater wires. In fact, the process takes place until the heater wires are actually in bare contact with the grid wires.

Figure 13:
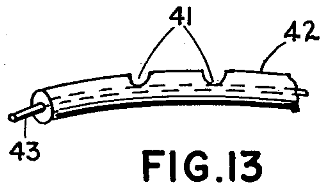
FIG. 13 shows in perspective a portion of a grid wire and the grooved or notched portions in the insulation representing the location of the heater wires.
Figure 12:
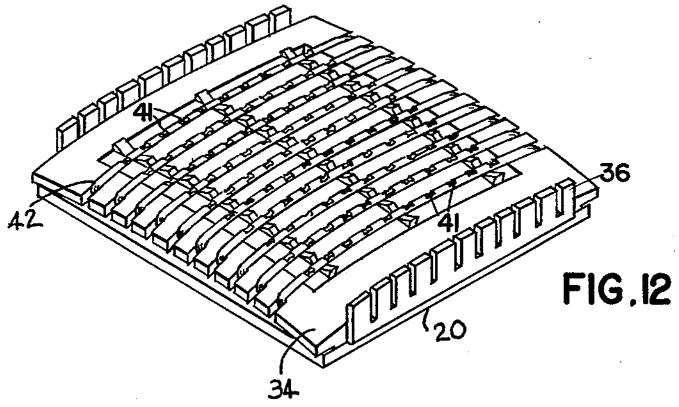
FIG. 12 shows in perspective the unitary structure of grid frame and grid overlay frame after the heater wires have been removed with the insulation of grid wires being removed at the points of contact with the heater wire.
Figure 11:
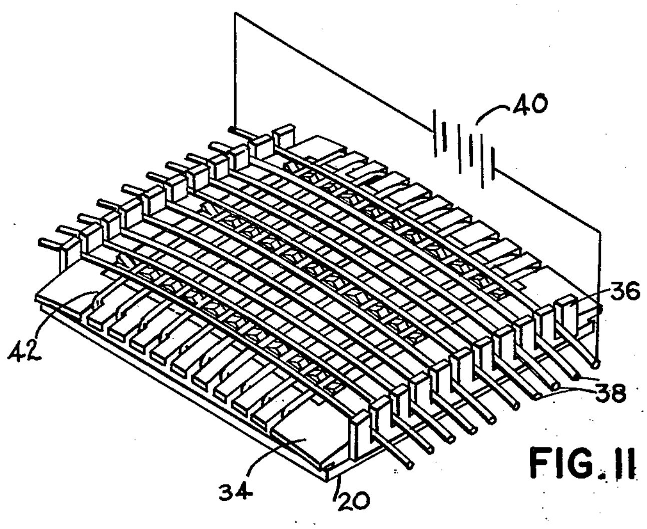
FIG. 11 shows in perspective the unitary structure of FIG. 9 and the heater wire overlay frame assembled as a complete unit, the heater wires transversely overlaying the grid wires are in point contact therewith and are also disposed to receive electric heater current from an electric current source.

FIGURE 10 shows the heater-wire frame 36 carrying the heater wires 38 in such a manner that when the grooves are formed they will be in position to receive the alignment rods previously mentioned. The frame 36 carrying the heater wires is first placed over the combined structure of FIG. 9 and secured thereto as shown in FIG. 11. After the heater wires are placed in position, transverse to the grid wires, an electric current is applied from a current source 40, so that heater current passes through the respective heater wires to elevate the temperatures thereof to the melting point of the plastic of the grid wires in contact with the heater wires. The plastic will substantially melt to the point where the heater wires and the grid wires are in actual wire to wire contact. It may be appreciated that although the heater wires as shown in FIG. 10 appear to be parallel and equally spaced, in fact, they may be spaced at varying distances with respect to each other, the reason therefore to be subsequently explained. After the grooves have been formed in the grid wire array, the heater wires are then removed so that there remains as shown in FIG. 12 a series of grooves 41 in each of the respective grid wires in the locations where the heater wires were placed. The FIG. 12 shows some of these grooves, it being appreciated that all of such grooves need not be shown to convey the proper impression. FIG. 13 shows in more detail a particular grid wire and the respective grooves 41, the grooves being substantially deep enough so that a portion of the bare wire 43 is exposed.

Figures 14, 15:
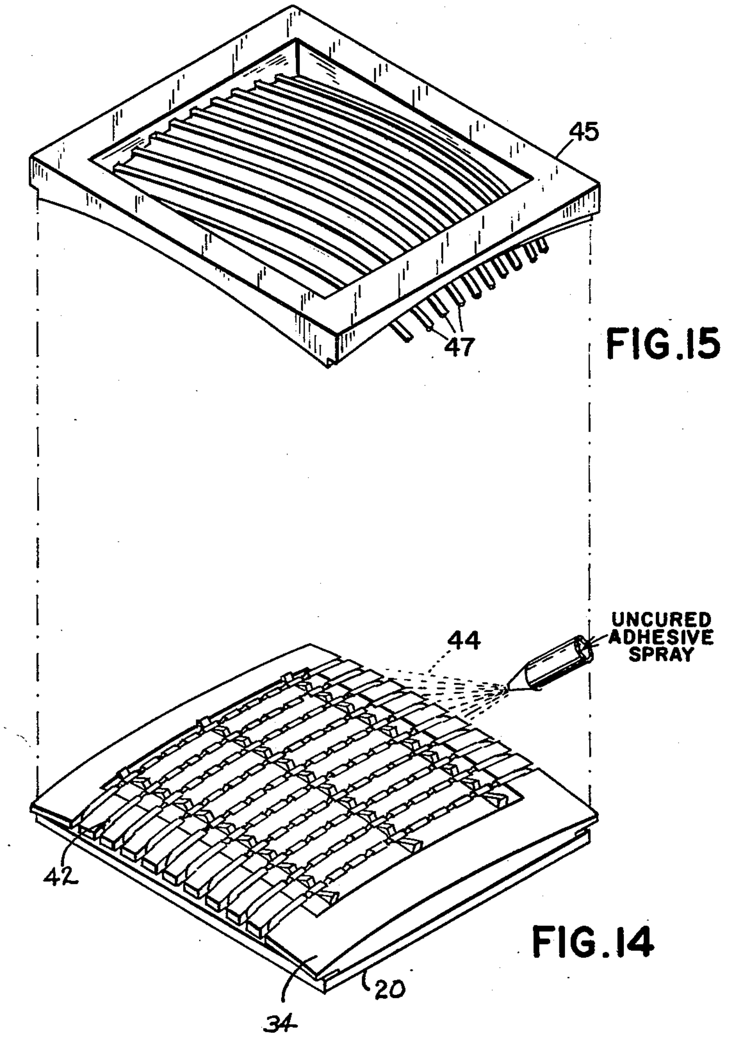
FIG. 14 shows in perspective the unitary structure of grid frame and grid overlay frame and the means disposed to spray the grid wires with an uncured adhesive.
FIG. 15 shows in perspective an overlay frame having disposed thereon an array of glass or plastic alignment rods in the positions formerly held by the heater wires.
Figure 16:
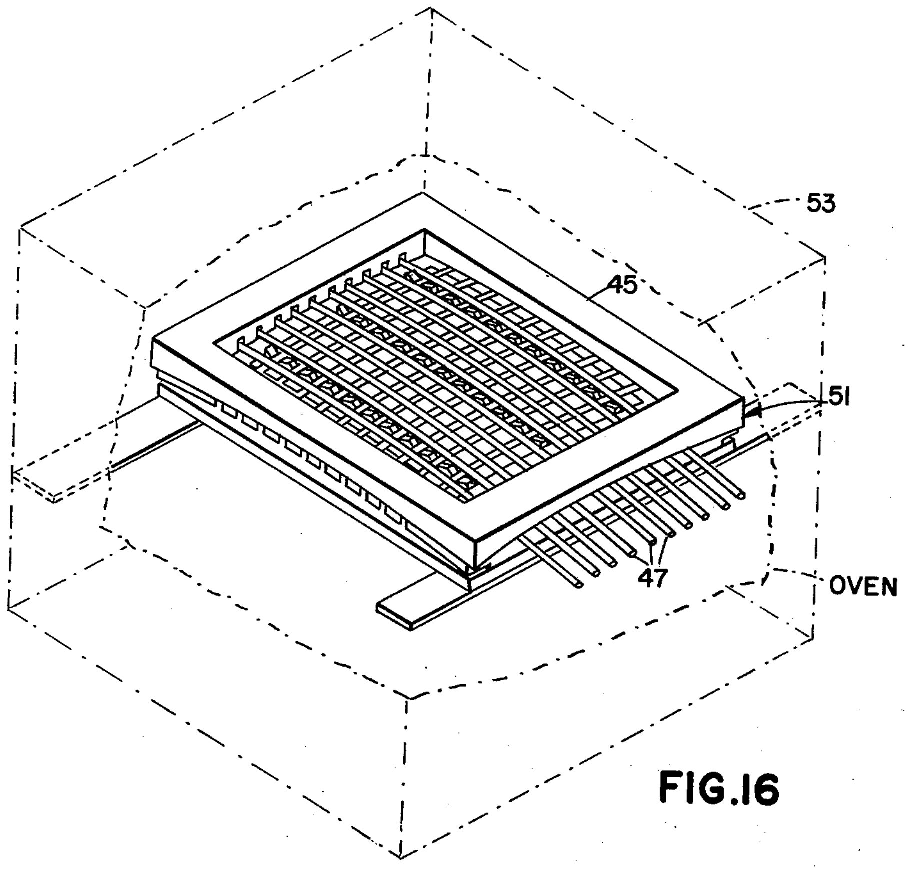
FIG. 16 shows in perspective the unitary structure of grid wire frame and grid overlay frame combined with the overlay frame of FIG. 15 to form a single grid frame unit and enclosed in an enclosure with the temperature raised to a ponit to cause the curing of the adhesive to create a bond between the alignment rod and grid wire.

Subsequent to the formation of the grooves 41 as outlined above, there is then applied to the heater wire a spray 44 of uncured adhesive as shown in FIG. 14, the adhesive clinging to the grid wire and also substantially covering the groove portion down to the bare wire within the groove. The uncured adhesive may be a water glass cement such as sodium silicate or an adhesive of a similar nature such as a ceramic paste which when exposed to ambient, or elevated to a particular range of temperatures up to 200° F., will become appropriately cured and cause a bonding of any material matter of a vitreous nature such as glass and the like with which it is in contact. After the spray of the uncured adhesive has been completed, an overlay frame 45, as shown in FIG. 15, having a series of alignment rods 47 is disposed with respect to the said frame in such a manner that it occupies the same positions as the heater wires previously utilized to create the grooved portions in the grid wires. The reason for this is obvious since it is required that the particular rods be aligned within the grooved portions of the grid wire so that the said rods will become firmly bonded to the grid wires along the grooved portions thereof. Any material may be used for the alignment rods which will produce satisfactory results, especially if this material be of a vitreous nature. One substance which has been found to be suitable is that which is known commercially as G–12 glass. This has the following composition:

| | Percent |
|---|---|
| $SiO_2$ | 56.6 |
| $Na_2$ | 3.3 |
| $K_2O$ | 9.3 |
| PbO | 28.6 |
| $Al_2O_3$ | 1.2 |
| $Sb_2O_3$ | 0.22 |
| $As_2O_3$ | 0.25 |

and other impurities about 0.5% by weight. When alignment rods having such composition are utilized, it is noticed that the electrons shadow (which each alignment rod would normally be expected to cast upon the phosphor coated surface of the screen electrode) is not visible when $$\frac{E_1}{E_2}$$

is roughly equal to ¼ where $E_2$ is the potential difference from the cathode to color screen and $E_1$ is the mean potential difference from the cathode to the wire grid as shown in FIG. 1. Reducing this voltage ratio causes an increasing amount of shadow. This particular feature is further detailed in U.S. Patent 2,796,546. After the alignment rods 47 are positioned within the frame 45, the frame 45 is then lowered and mounted to the grid and overlay frame structure of FIG. 14 so that as stated above each of the alignmnet rods is positioned within the grooves provided therefore within the grid wire frame. This is shown in FIG. 16 so that the combined frames form a complete unitary structure 51 and the complete unitary structure then suitably placed within a curing oven 53. The oven is then raised to a temperature of the order of from 100° F. to 200° F. so that the uncured adhesive becomes cured to create a bond between the grid wire and the alignment rods. The rods used herein may or may not have a plastic coating applied thereto. It may be appreciated that if a plastic coating were applied to the rod it would make it stronger and easier to handle since the rod in the narrow gauges utilized herein is rather brittle and easily ruptured and broken. Hence, by the application of a plastic coating to the rod, it becomes stronger and perhaps easier to work with. After the formation of the bond between the grid wire and alignment rod the unitary structure 51 is then inverted within the oven and the oven again subjected to an elevated temperature, this time the temperature sufficiently high, in the order from 250° F. to 300° F. to cause the plastic covering of the grid wire to melt and become free flowing. The plastic subjected to this elevated temperature will melt and flow freely and drip off from the grid wires, carrying the residue adhesive previously applied without the grooved areas, into some suitable receptacle at the bottom of the oven. It may be appreciated here that the bond between grid wire and alignment rod, created by the cured adhesive will not become effected by the elevated temperature since the molecular structure of the cured adhesive is such that the temperature which causes the plastic to melt is not sufficiently high to rupture or melt the cured adhesive and, therefore, rupture the bond between the grid wire and the alignment rod. The unitary structure 51 is next removed from the oven and dismantled in a manner to remove the grid structure therefrom.

It may be appreciated here that as mentioned previously the grid wires have a certain ductileness so that essentially it is not necessary for the wires to be under any kind of tensile stresses. In the past, these tensile stresses gave rise to certain vibratory effects due to the cyclic switching of the grid electrodes. Dampening rods were required to reduce this effect which originally caused color distortion. It may be appreciated here that where you have such ductileness, it is not necessary to have the wires under tension and, therefore, the cyclic switching will not give rise to any of these so-called vibratory effects. Since the alignment rods are for the purpose of maintaining the grid wires at a fixed spacial relationship with each other the necessity for maintaining the grid wires under tension is completely dispensed with. Past methods for forming the grid structure included the positioning of short lengths of dampening rods with respect to the grid wires that they were first placed over and then under adjacent wires, and scattered in all directions across the complete grid screen. This manner of placing the dampening rods on to the grid structure necessitated special devices and special methods which in itself was time consuming, expensive and inefficient. The reason for the random or scattered pattern of the damp rods was the destruction of a regular structure in the color pattern of the tube which regular structure would otherwise be readily recognizable. Following this particular teaching as to randomness it can be appreciated herein that the alignment rods, as defined within the instant embodiment, can also have a random displacement relative to each other and still maintain the relative fixed positioning of the grid wire relative to each other. This manner of placement of the rods assures no lateral displacement whenever the tube is in operation with any piece of equipment it may be associated with such as a receiver, image pickup device and the like.

Figure 17:
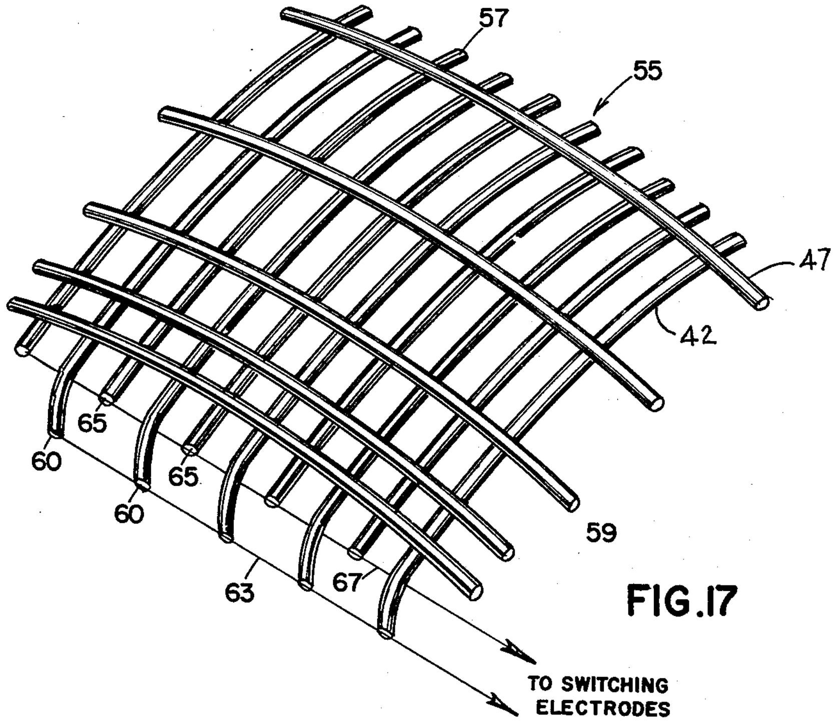
FIG. 17 shows in perspective a portion of the finished grid having the particular structural and curvature configuration desired.

FIG. 17 shows in perspective a portion of the completed formed grid 55 with the respective grid wires 57 and alignment rods 59 bonded thereto. It can be seen from the said figure that the alignment rods have a certain degree of randomness in that their lateral displacement is different for adjacent rods, this displacement difference being effected throughout the area of the grid surface to avoid and destroy any regular line structure in the color pattern. If the transverse wires were uniformly spaced rather than random, a moiré pattern effect would be evident and would give a distorting effect to the picture. Further random spacing is necessary to destroy any resonating type effect that would become otherwise apparent if the wires were uniformly spaced by virtue of the vibrating effects that might be present when the switching potentials were applied to the grid structure. The grid 55 after having the alignment rods properly bonded thereto is a completed self-supporting structure, there being no warping, bending or other distortion of the structure after its completion. In other words, by virtue of the intersticial bonding effect between the alignment rods and the grid wires, the completed grid simulates a truss-like structure and is completely self-supporting and is completely capable of retaining its spacial configuration without any need or aid of external supports. Because the grid 55 is a self-supporting structure there is no need for any heavy grid frame or support, used heretofore to hold the grid wires in tension and to support the grid structures as a whole. In the past the heavy grid frame was usually under severe tensional stresses and subjected to cyclic heating temperatures which caused a certain tendency on the part of the frame to become distorted causing a definite degree of mis-alignments of the grid wires which, of course, resulted in picture distortion. In the present case, the grid wires are not only malleable and therefore not under severe tensional stresses, but also have high temperatures coefficients so that they are little effected by the temperature cycling. The following table shows the physical characteristics of some of the material useful for the grid wires in the instant case;

| | Relative Conductivity | Coff. of Expansion per ° F.×10⁴ | Melting Pt., ° F. | Spec. Gravity |
|---|---|---|---|---|
| Aluminum | 64 | 0.128 | 1,220 | 2.70 |
| Copper | 100 | 0.0923 | 2,696 | 8.94 |
| Gold | 70 | 0.0789 | 1,945 | 19.30 |
| Silver | 104 | 0.115 | 1,761 | 10.49 |

To support the grid 55, any small lightweight suitable frame made from aluminum and the like can be used so that a completed grid structure may be made and subsequently mounted by adequate mounting members to the tube panel. FIGS. 1 and 2 show the grid and a frame suitable for the purpose supported by support members 61 attached to the tube panel 3. The grid itself as originally explained is composed of a dual set of interleaved substantially co-planar and insulated electrodes and the cyclic switching voltages for effecting color control applied thereto. As shown in FIG. 17, the grid 55 has alternate grid wires 60 all commonly connected to a common terminal bus wire 63 and the remaining alternate grid wires 65, interleaved between grid wire 60 commonly connected to a common terminal bus wire 67. The terminal bus wires are then suitably connected externally to a source of switching voltages, not shown, to effect the cyclic switching of the grid electrodes and thereby effect control of the color image upon the viewing panel.

In summary it may be appreciated that the present invention provides means for constructing a grid to conform to any spacial configuration of the viewing panel a factor not heretofore possible. As a matter of fact, any spacial configuration of the grid structure is now possible so that any degree of control over the electron beam is possible to assure proper focusing and deflection sensitivity over the entire scan or travel of the raid beam. Further, the grid structure can now dispense with heavy retaining frames previously required to hold the grid wires in tension since the grid is now a completely self-supporting structure, and there is no need to be concerned with any vibratory effects of the grid wires, a factor which caused considerable concern because of the color distortion resulting therefrom. Throughout the specification herein there has been shown means and methods for forming a new and novel type of color control grid for a color cathode-ray tube using the post-deflection-focusing principles, but it may be appreciated that the said means and methods may be used in various other types of cathode-ray tubes which use post-deflection-focusing principles. Another consideration of the invention is the fact that metal rather than glass alignment rods may be used as long as there is maintained between the wire and rod an insulating characteristic and the metal utilized is non-magnetic in character or that it will not have any effect in the creation of an electron shadow originating behind the said rods. Further, it is to be noted that certain changes, modifications and alterations may be made from time to time in the present application without detracting from the true intent and purpose of the invention.

Having defined the invention in terms of certain specific embodiments what is claimed is:

1. In combination with a cathode-ray tube for the display of television images in color which includes an electron source for directing a beam of electrons against a target surface across which said beam is adapted to be deflected to trace a raster, and a display screen upon said target surface comprising a light-transmissive base having a coating thereon of a plurality of phosphors each of which is emissive on electron impact of light of a different component color, the color of said phosphors additively producing white and said phosphors being disposed on said base in a repeating pattern of color cells each of which comprises a group of strips including a strip of each of said phosphors extending across said screen, the width of the group of strips being of the order of magnitude of one elemental area of the image to be reproduced; means for establishing a multiplicity of electron lenses each adapted to focus electrons of said beam on a selected phosphor strip within a corresponding color cell comprising a conductive layer covering the phosphors on said screen, a color-grid of elongated equally spaced parallel malleable linear conductors mounted adjacent to said screen with the conductors being substantially parallel with the phosphor strips of said color cells and substantially forming a surface which conforms to the curvature of the target surface, the color-grid also including an array of alignment rods mounted transversely to the conductors and spaced relative to each other to maintain the spacial configuration of the grid surface relative to the target surface.

2. In combination with a cathode-ray tube for the display of television images in color which includes an electron source for directing a beam of electrons against a target surface across which said beam is adapted to be deflected to trace a raster, and a display screen upon said target surface comprising a light-transmissive base having a coating thereon of a plurality of phosphors each of which is emissive on electron impact of light of a different component color, the colors of said phosphors additively producing white and said phosphors being disposed on said base in a repeating pattern of color cells each of which comprises a group of strips including a strip of each of said phosphors extending across said screen, the width of the group of strips being of the order of magnitude of one elemental area of the image to be reproduced; means for establishing a multiplicity of electron lenses each adapted to focus electrons of said beam on a selected phosphor strip within a corresponding color cell comprising a conductive layer covering the phosphors on said screen, a self-supporting color-grid of elongated equally spaced parallel malleable linear metal wires having a plastic coating and mounted adjacent to said screen with the wires being substantially parallel with the phosphor strips of said color cells and substantially forming a surface which conforms to the curvature of the target surface, the color-grid also including an array of alignment vitreous rods mounted transversely to the wires and randomly spaced relative to each other to maintain the spacial configuration of the grid surface relative to the target surface and cause the said grid to be self-supporting.

3. In combination with a cathode-ray tube for the display of television images in color according to claim 2 and wherein the grid malleable metal wires are composed of gold plated aluminum wire.

4. In combination with a cathode-ray tube for the display of television images in color according to claim 2 and wherein the grid malleable metal wires are composed of silver plated aluminum wire.

5. In combination with a cathode-ray tube for the display of television images in color according to claim 2 and wherein the grid malleable metal wires are composed of gold plated copper wire.

6. In combination with a cathode-ray tube for the display of television images in color according to claim 2 and wherein the grid malleable metal wires are composed of silver plated copper wire.

7. In combination with a receiver for the display of television images in color which includes a cathode-ray tube with an electron source for directing a beam of electrons against a target surface of the tube across which said beam is adapted to be deflected to trace a raster, and a display screen upon said target surface comprising a light-transmissive base having a coating thereon of a plurality of phosphors each of which is emissive on electron impact of light of a different component color, the colors of said phosphors additively producing white and said phosphors being disposed on said base in a repeating pattern of color cells each of which comprises a group of strips including a strip of each of said phosphors extending across said screen, the width of the group of strips being of the order of magnitude of one elemental area of the image to be reproduced; means for establishing a multiplicity of electron lenses each adapted to focus electrons of said beam on a selected phosphor strip within a corresponding color cell comprising a conductive layer covering the phosphors on said screen, a self-supporting color-grid of elongated equally spaced parallel malleable linear conductors mounted adjacent to said screen with the conductors being substantially parallel with the phosphor strips of said color cells and substantially forming a surface which conforms to the curvature of the target surface, the color-grid also including an array of alignment rods mounted transversely to the conductors and randomly spaced relative to each other to maintain the spacial configuration of the grid surface relative to the target surface and cause the said grid to be self-supporting.

8. In a cathode-ray tube for the display of images in color and black and white which includes an electron source for directing a beam of electrons, a target surface across which said beam is adapted to be deflected to trace a raster, and a display screen upon said target surface, the combination comprising, a light-transmissive base having a coating thereon of a plurality of phosphors each of which is emissive on electron impact of light of a different component color, the colors of said phosphors being capable of additively producing white and are disposed on said base in a repeating pattern of color sub-elements of one complete white element, means for establishing a multiplicity of electron lenses with each being adapted to focus electrons of the said beam on a selected phosphor within a corresponding color sub-element which means comprises a conductive layer covering the phosphors on the said screen, a grid of elongated equally spaced parallel malleable linear conductors mounted adjacent to said screen with the conductors being substantially parallel with the phosphor of said color sub-elements and substantially forming a surface which conforms to the curvature of the target surface, the grid also including an array of alignment rods bonded transversely to the conductors and spaced relative to each other to maintain the spacial configuration of the grid surface relative to the target surface so as to produce a pleasing and desirable distribution of white elements when such white elements are scanned as a raster by the cathode-ray beam.

9. In a cathode-ray tube for the display of images in color and black and white which includes an electron source for directing a beam of electrons, a target surface across which said beam is adapted to be deflected to trace a raster, and a display screen upon said target surface, the combination comprising, a light-transmissive base having a coating thereon of a plurality of phosphors each of which is emissive on electron impact of light of a different component color, the colors of said phosphors being capable of additively producing white and are disposed on said base in a repeating pattern of color sub-elements of one complete white element, means for establishing a multiplicity of electron lenses with each being adapted to focus electrons of the said beam on a selected phosphor within a corresponding color sub-element which means comprises a conductive layer covering the phosphors on the said screen, a grid of elongated equally spaced parallel malleable plastic covered linear conductors mounted adjacent to said screen with the conductors each having a series of grooves in the plastic covering and are substantially parallel with the phosphor of said color sub-elements and substantially forming a surface which conforms to the curvature of the target surface, the grid also including an array of parallel equally spaced alignment rods bonded transversely to the conductors in the respective grooves of the plastic covered conductors and spaced relative to each other to maintain the spacial configuration of the grid surface relative to the target surface so as to produce a pleasing and desirable distribution of white elements when such white elements are scanned as a raster by the cathode-ray beam.

10. In a cathode-ray tube for the display of images in color and black and white according to claim 9 and wherein the bonded alignment rods are composed of a vitreous like material.

11. In a cathode-ray tube for the display of images in color and black and white according to claim 9 and wherein the bonded alignment rods are composed of G–12 commercial glass.

12. In a cathode-ray tube for the display of images in color and black and white according to claim 9 and wherein the bonded alignment rods are composed of of non-magnetic metal.

References Cited in the file of this patent

UNITED STATES PATENTS

| | | |
|---|---|---|
| 2,625,734 | Law | Jan. 20, 1953 |
| 2,767,457 | Epstein | Oct. 23, 1956 |
| 2,905,849 | Kazan | Sept. 22, 1959 |
| 2,947,899 | Kaplan | Aug. 2, 1960 |